(12) United States Patent
Park et al.

(10) Patent No.: US 11,326,759 B2
(45) Date of Patent: May 10, 2022

(54) LAMP FOR VEHICLE HAVING A MOVABLE MIRROR AND A LIGHT ADJUSTMENT UNIT

(71) Applicant: SL Corporation, Daegu (KR)

(72) Inventors: Hye Jin Park, Gyeongsan-si (KR); Jong Min Lee, Gyeongsan-si (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 17/071,517

(22) Filed: Oct. 15, 2020

(65) Prior Publication Data

US 2021/0199261 A1 Jul. 1, 2021

(30) Foreign Application Priority Data

Dec. 26, 2019 (KR) .......................... 10-2019-0174764

(51) Int. Cl.
*F21S 41/675* (2018.01)
*F21S 41/125* (2018.01)
*B60Q 1/00* (2006.01)
*F21V 13/06* (2006.01)

(52) U.S. Cl.
CPC .......... *F21S 41/675* (2018.01); *B60Q 1/0029* (2013.01); *F21S 41/125* (2018.01); *F21V 13/06* (2013.01); *B60Q 2300/32* (2013.01); *B60Q 2300/45* (2013.01)

(58) Field of Classification Search
CPC ........ F21S 41/675; F21S 41/125; F21V 5/008
See application file for complete search history.

(56) References Cited

U.S. PATENT DOCUMENTS

| | | | |
|---|---|---|---|
| 9,777,901 B2* | 10/2017 | Reinprecht | F21S 41/285 |
| 10,179,534 B2* | 1/2019 | Hoshino | F21S 41/336 |
| 2016/0039330 A1* | 2/2016 | Rosenhahn | F21S 41/321 362/512 |
| 2019/0113200 A1* | 4/2019 | Murakami | F21S 41/365 |

\* cited by examiner

*Primary Examiner* — Robert J May
(74) *Attorney, Agent, or Firm* — United One Law Group LLC; Kongsik Kim; Jhongwoo Peck

(57) ABSTRACT

A lamp for a vehicle includes a light source unit for generating a first light; a light adjustment unit for adjusting a first light concentration for the first light to generate a second light having a second light concentration from the first light concentration; and a movable mirror unit for reflecting the second light to form an image of a predetermined shape on a road surface. A position where the image is formed on the road surface is changed depending on a position of the movable mirror unit.

10 Claims, 12 Drawing Sheets

LAMP FOR VEHICLE HAVING A MOVABLE MIRROR AND A LIGHT ADJUSTMENT UNIT

CROSS-REFERENCE TO RELATED APPLICATION

This application claims priority from Korean Patent Application No. 10-2019-0174764 filed on Dec. 26, 2019, which application is herein incorporated by reference in its entirety.

BACKGROUND

1. Technical Field

The present disclosure relates to a lamp for a vehicle. More specifically, it relates to a lamp for a vehicle that allows an image for information delivery to be formed on a road surface around the vehicle.

2. Description of the Related Art

Generally, a vehicle is equipped with various types of vehicle lamps having a function of securing a field of view and confirming an object in the vicinity of the vehicle in low light conditions (e.g. nighttime driving), and a signaling function for notifying other vehicle or road users of a running state of the vehicle.

For example, head lamps or fog lamps are intended to secure a field of view, and daytime running lamps, position lamps, turn signal lamps, tail lamps, or brake lamps are intended for signaling function. In addition, the installation standards and specifications of such vehicle lamps are stipulated by regulations to allow each function to be fully utilized.

Recently, autonomous driving that minimizes the driver's intervention in the vehicle operation has been actively developed to enhance the driver's convenience. In this regard, information that may be delivered by the field of view securing function or the signaling function is limited. Therefore, there is a need for a way to deliver more various information.

SUMMARY

Aspects of the present disclosure provide a lamp for a vehicle that may improve communication with the vehicle by forming an image for information delivery on a road surface around the vehicle. Aspects of the present disclosure also provide a lamp for a vehicle that enables formation of a clear image even if a position where the image is formed on a road surface around the vehicle changes. However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, a lamp for a vehicle may include a light source unit for generating a first light; a light adjustment unit for adjusting a first light concentration for the first light to generate a second light having a second light concentration that is different from the first light concentration; and a movable mirror unit for reflecting the second light to form an image of a predetermined shape on a road surface. In particular, a position where the image is formed on the road surface may be changed depending on a position of the movable mirror unit.

The light source unit may comprise a plurality of light sources; and an optical unit for synthesizing light generated from the plurality of light sources to generate the first light. At least some of the plurality of light sources may generate light of different colors. Further, the optical unit may cause the light generated from each of the plurality of light sources to be transmitted or reflected. In particular, the optical unit may comprise a prism or a mirror.

The light adjustment unit may comprise a plurality of lenses, and the plurality of lenses may have different effective areas. The plurality of lenses may comprise a first lens to which the first light is incident; and a second lens from which the second light is emitted. In particular, an effective area of the first lens may be greater than an effective area of the second lens. The first lens and the second lens may have the same optical axis. Further, the first light incident on the first lens and the second light emitted from the second lens may proceed substantially parallel to the optical axis.

The first lens may cause the first light to be concentrated on a focal point that is disposed between the first lens and the second lens. In particular, the first lens may have a different focal length than the second lens.

A mirror unit may be further provided for reflecting the first light and causing the first light to proceed to the light adjustment unit. At least a portion of the mirror unit may face the movable mirror unit to allow the first light to pass through the light adjustment unit and proceed to the movable mirror unit.

A lamp for a vehicle according to the present disclosure may provide one or more of the following benefits. By forming an image for information delivery on a road surface around the vehicle, more various information may be delivered or conveyed to other road users, and accordingly, communication may be improved. In addition, as a position where the image is formed on the road surface around the vehicle changes, a clearer image may be formed, thereby enabling the delivery of more accurate information. The benefits of the present disclosure are not limited to the above-mentioned benefits, and other benefits not mentioned may be clearly understood by a person skilled in the art from the claims.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the exemplary embodiments set forth herein. Rather, these exemplary embodiments are provided so that this disclosure will be thorough and complete and will fully convey the concept of the disclosure to those skilled in the art, and the present disclosure will only be defined by the appended claims. Throughout the specification, like reference numerals in the drawings denote like elements.

In some exemplary embodiments, well-known steps, structures and techniques will not be described in detail to avoid obscuring the disclosure.

The terminology used herein is for the purpose of describing particular exemplary embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Exemplary embodiments of the disclosure are described herein with reference to plan and cross-section illustrations that are schematic illustrations of idealized exemplary embodiments of the disclosure. As such, variations from the shapes of the illustrations as a result, for example, of manufacturing techniques and/or tolerances, are to be expected. Thus, exemplary embodiments of the disclosure should not be construed as limited to the particular shapes of regions illustrated herein but are to include deviations in shapes that result, for example, from manufacturing. In the drawings, respective components may be enlarged or reduced in size for convenience of explanation.

Hereinafter, the present disclosure will be described with reference to the drawings for explaining a lamp for a vehicle according to exemplary embodiments of the present disclosure.

Figure 1:
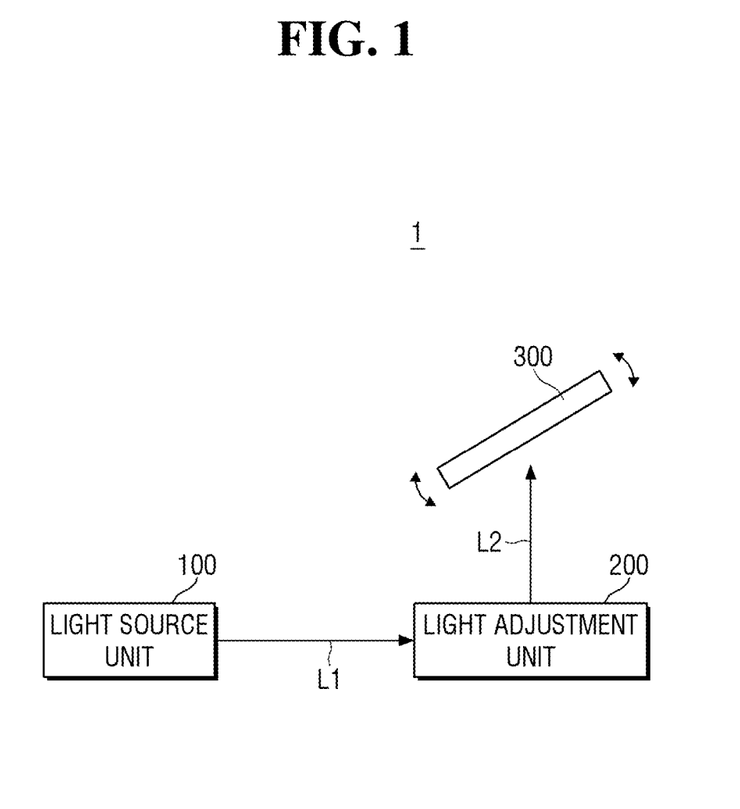
FIG. 1 is a schematic diagram showing a configuration of a lamp for a vehicle according to an exemplary embodiment of the present disclosure.

FIG. 1 is a schematic diagram showing a configuration of a lamp for a vehicle according to an exemplary embodiment of the present disclosure. Referring to FIG. 1, the lamp for the vehicle 1 according to the exemplary embodiment of the present disclosure may include a light source unit 100, a light adjustment unit 200, and a movable mirror unit 300.

In the exemplary embodiment of the present disclosure, the lamp for the vehicle 1 may be used for a function of improving communication by forming an image on a road surface around the vehicle, the image being of a predetermined shape that represents various information that a passenger, a surrounding vehicle, or a pedestrian needs to recognize. However, the present disclosure is not limited thereto, and the lamp for the vehicle 1 of the present disclosure may be used for various types of lamps installed in a vehicle. Herein, the image formed on the road surface around the vehicle may be include characters, patterns, or a combination thereof.

Figure 2:
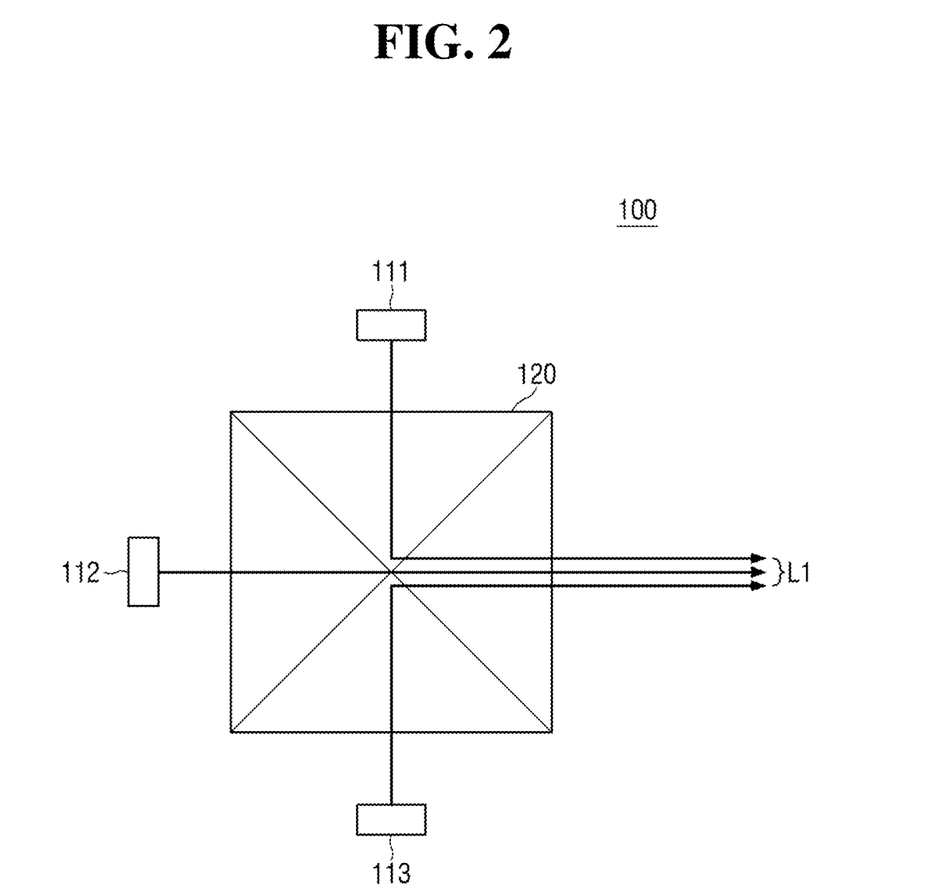
FIGS. 2 to 4 are schematic diagrams showing a configuration of a light source unit according to the exemplary embodiment of the present disclosure.
Figure 3:
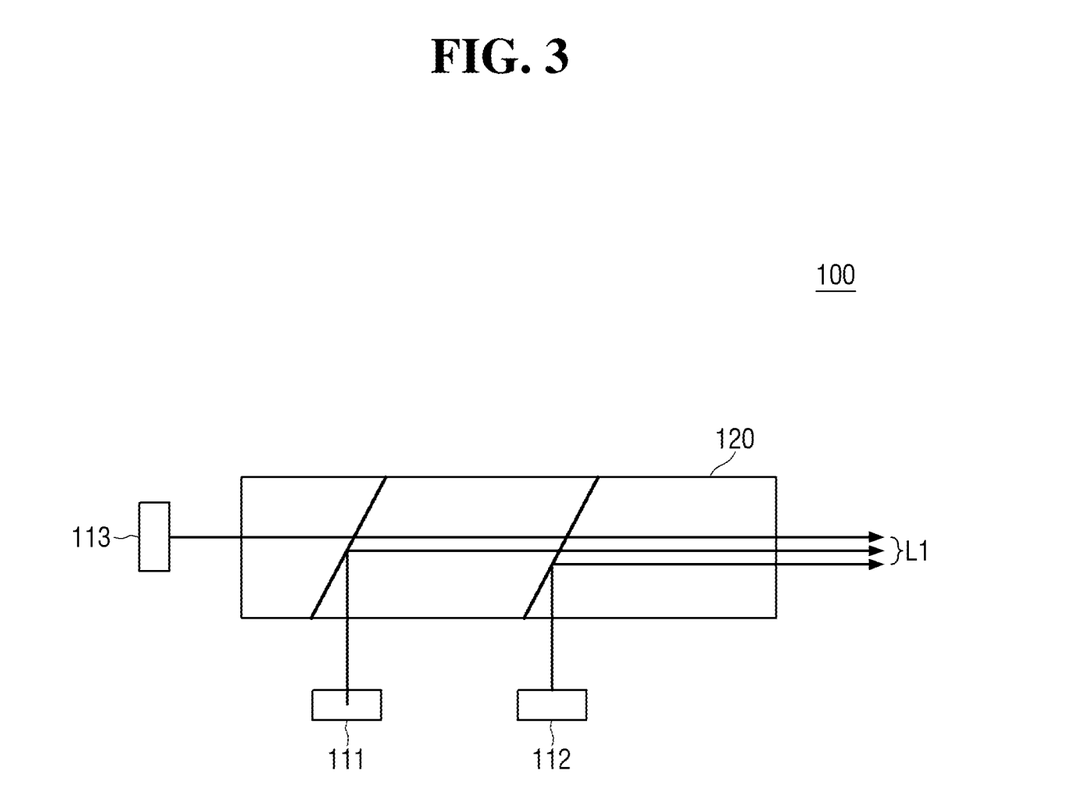
Figure 4:
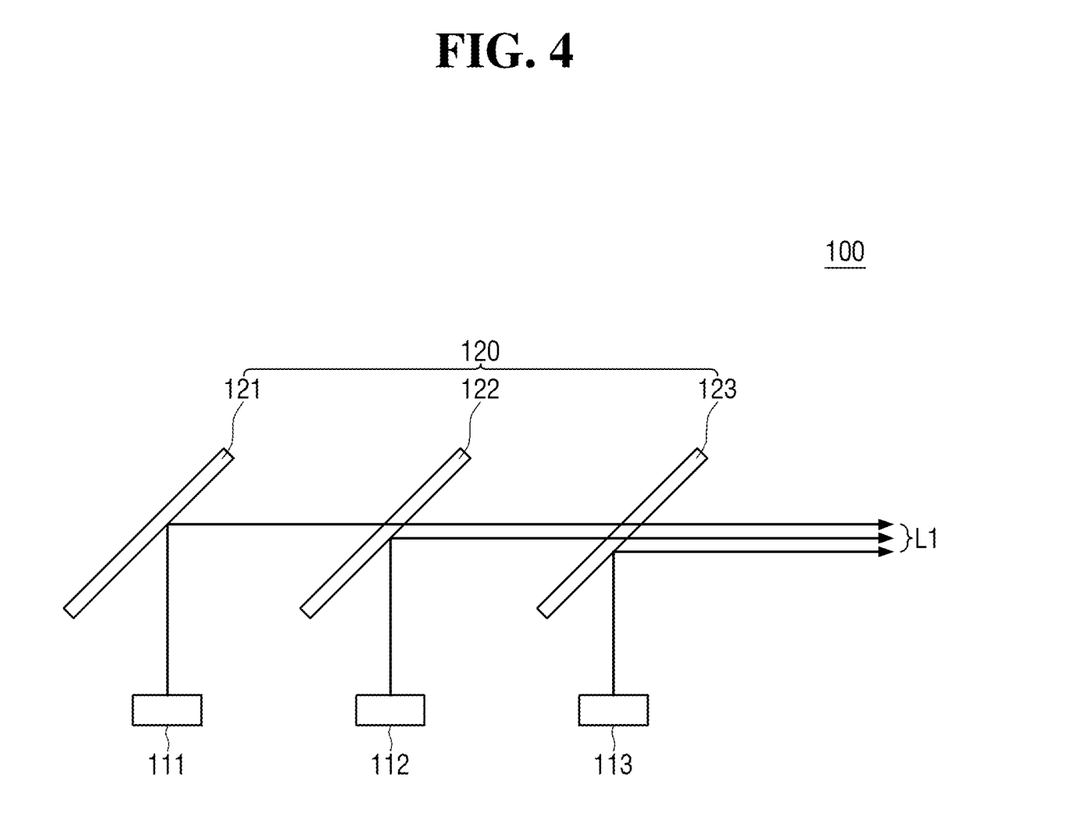

The light source unit 100 may generate light L1 (hereinafter, referred to as "first light") having a color and/or brightness suitable for a function of the lamp for the vehicle 1 of the present disclosure. FIGS. 2 to 4 are schematic diagrams showing a configuration of a light source unit according to the exemplary embodiment of the present disclosure.

Referring to FIGS. 2 to 4, the light source unit 100 according to the exemplary embodiment of the present disclosure may include a plurality of light sources 111, 112, and 113, and an optical unit 120 to synthesize (e.g., combine or collect) light generated from the plurality of light sources 111, 112, and 113 to generate the first light L1. In the exemplary embodiment of the present disclosure, the light source unit 100 may include the plurality of light sources 111, 112, and 113 to generate light of different colors so that light having various colors may be generated from the light source unit 100. However, the present disclosure is not limited thereto, and the number of light sources included in the light source unit 100 or the color of the light generated from each light source may vary depending on the color of the light required in the lamp for the vehicle 1 of the present disclosure.

Hereinafter, the plurality of light sources 111, 112, and 113 of the exemplary embodiment of the present disclosure will be referred to as a first light source 111 that generates red light, a second light source 112 that generates green light, and a third light source 113 that generates blue light, respectively. The color of the first light L1 generated from the light source unit 100 may be changed depending on an intensity of the light generated from each of the first to third light sources 111, 112, and 113. The intensity of the light generated from each of the first to third light sources 111, 112, and 113 may refer to not only a brightness of the light, but also an on-off state of the light source. The optical unit 120 may generate synthetic light by synthesizing the light generated from at least one of the first to third light sources 111, 112, and 113. It may be understood that the synthetic light generated by the optical unit 120 is the first light L1 generated from the light source unit 100.

FIGS. 2 and 3 are examples of the case where a prism is used as the optical unit 120. The optical unit 120 may transmit some of the light generated from the first to third light sources 111, 112, and 113, and reflect other, thereby enabling the light generated from the first to third light sources 111, 112, and 113 to be synthesized. In other words, the optical unit 120 may transmit the light in some wavelength bands of the light generated from the first to third light sources 111, 112, and 113, and may reflect the light in other wavelength bands to generate the synthetic light.

FIG. 2 is an example in which the light generated from each of the first to third light sources 111, 112, and 113 is incident through different surfaces of the prism (i.e., the optical unit 120), in which the light generated from the first and third light sources 111 and 113 is reflected, and the light generated from the second light source 112 is transmitted, so that the synthetic light is generated.

FIG. 3 is an example in which the light generated from the first and second light sources 111 and 112 is incident through the same surface of the prism (i.e., the optical unit 120), and the light generated from the third light source 113 is incident through a surface different from the first and second light sources 111 and 112, in which the light generated from the first and second light sources 111 and 112 is reflected, and the light generated from the third light source 113 is transmitted, so that the synthetic light is generated.

In FIGS. 2 and 3 as described above, a prism may be used as the optical unit 120. However, the present disclosure is not limited thereto, and a plurality of mirrors 121, 122, and 123 may be used as the optical unit 120 as shown in FIG. 4. In this case, the plurality of mirrors 121, 122, and 123 may transmit or reflect the light generated from each of the first to third light sources 111, 112, and 113 to generate the synthetic light. For example, each of the plurality of mirrors 121, 122, and 123 may reflect the light generated from any one of the first to third light sources 111, 112, and 113, and may transmit the light generated from the other light sources to generate the synthetic light.

In the exemplary embodiment of the present disclosure as described above, examples of where a prism is used as the optical unit 120, and where a mirror is used as the optical unit 120 are separately described. However, the present disclosure is not limited thereto, and both a prism and a mirror may be used in one optical unit 120. In addition, various types of optical elements that enable synthesis of light as well as prisms and mirrors may be used as the optical unit 120.

Referring to FIG. 1 again, the light adjustment unit 200 according to the exemplary embodiment of the present disclosure may adjust a light concentration of the light generated from the light source unit 100. Adjusting the light concentration of the light generated from the light source unit 100 by the light adjustment unit 200 may ensure that a clear image is formed when the image is formed on a road surface around the vehicle through the lamp for the vehicle 1 of the present disclosure.

Figure 5:
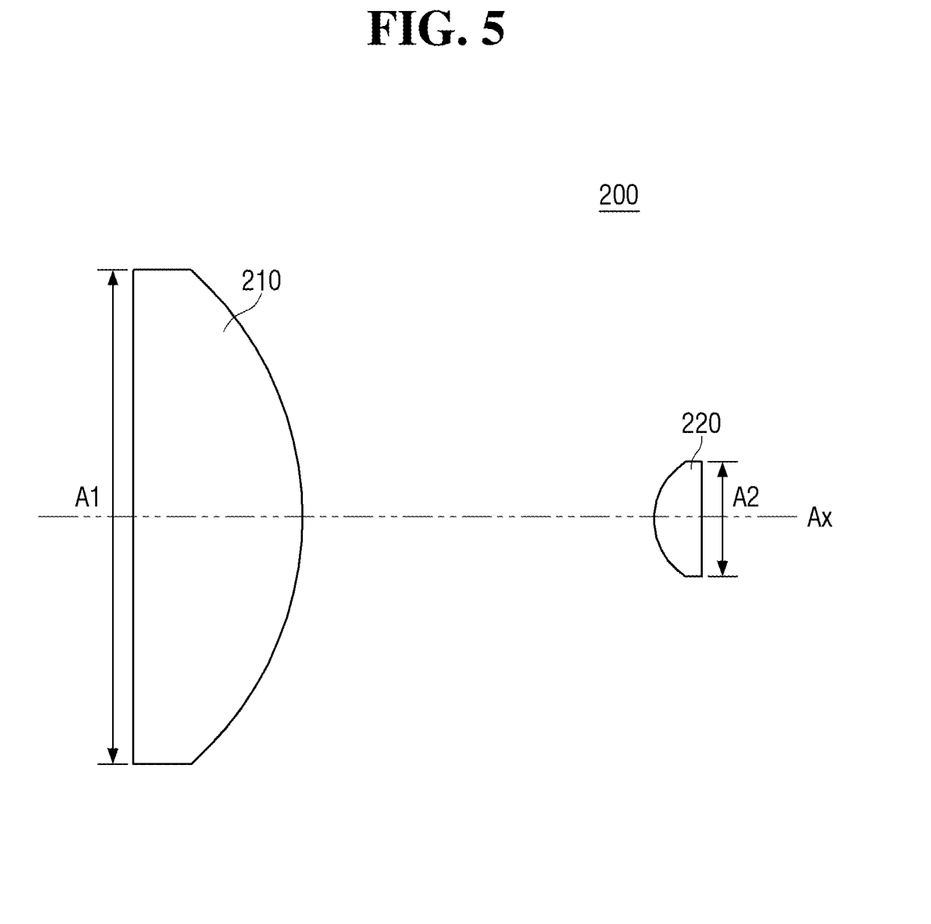
FIG. 5 is a schematic diagram showing a configuration of a light adjustment unit according to the exemplary embodiment of the present disclosure.

FIG. 5 is a schematic diagram showing a configuration of a light adjustment unit according to the exemplary embodiment of the present disclosure. Referring to FIG. 5, the light adjustment unit 200 according to the exemplary embodiment of the present disclosure may include a plurality of lenses 210 and 220 arranged along a direction of light proceeding (e.g. light projection). Hereinafter, in the exemplary embodiment of the present disclosure, the plurality of lenses 210 and 220 will be referred to as a first lens 210 and a second lens 220, respectively.

The first lens 210 may be disposed closer to the light source unit 100 than the second lens 220 with respect to a proceeding path of the first light L1 that is generated from the light source unit 100. The first lens 210 and the second lens 220 may be disposed to have a coinciding optical axis Ax. In addition, an effective area of the second lens 220 may be formed to be smaller than an effective area of the first lens 210. This configuration may increase the light concentration while the light incident from the light source unit 100 passes through the first lens 210 and the second lens 220. Herein, the effective area of the lens may refer to an area projected on a plane perpendicular to an optical axis of the lens, through which the light from the light source 110 actually passes. The effective area may be, within the entire area of the lens projected on the plane perpendicular to the optical axis of the lens, the part that actually affects a path of incident light. The effective area of the lens may be an area having at least one radius around the optical axis of the lens. In addition, the effective area of the lens may be the entire area of the lens, or may be a partial area thereof.

FIG. 5 is an example in which the entire areas of the first lens 210 and the second lens 220 serve as the effective areas, the first lens 210 is formed larger than the second lens 220 so that the effective area A1 of the first lens 210 is larger than the effective area A2 of the second lens 220, and thus, a focal length of the second lens 220 is shorter than a focal length of the first lens 210. As shown in FIG. 5, the first lens 210 and the second lens 220 may have different physical sizes. However, the present disclosure is not limited thereto, and even if the first lens 210 and the second lens 220 have the same or substantially same physical size in consideration of assembly or the like, the first lens 210 may have a larger effective area than the second lens 220 by adjusting optical properties such as curvatures of an incident or emitting surface of the first lens 210 and the second lens 220. It may be understood that different sizes of the first lens 210 and the second lens 220 mean that lengths of at least one radial direction are different from each other with respect to the optical axis Ax.

In addition, in the exemplary embodiment of the present disclosure, a shape of the lens and a shape of the effective area may be the same. However, the present disclosure is not limited thereto, and the shape of the lens and the shape of the effective area may be different. As an example, when the lens has a circular shape, the effective area may have a circular shape or a non-circular shape. The shape of the lens and the shape of the effective area are not limited to the examples described above, and the lens and the effective area may have a circular shape, a polygonal shape, or a combination thereof.

In the exemplary embodiment of the present disclosure, the first lens 210 and the second lens 220 may be used as the light adjustment unit 200. In this case, the first lens 210, the second lens 220, the effective area of the first lens 210, and the effective area of the second lens 220 may have the same shape, or one of them may have a different shape from the other.

Figure 6:
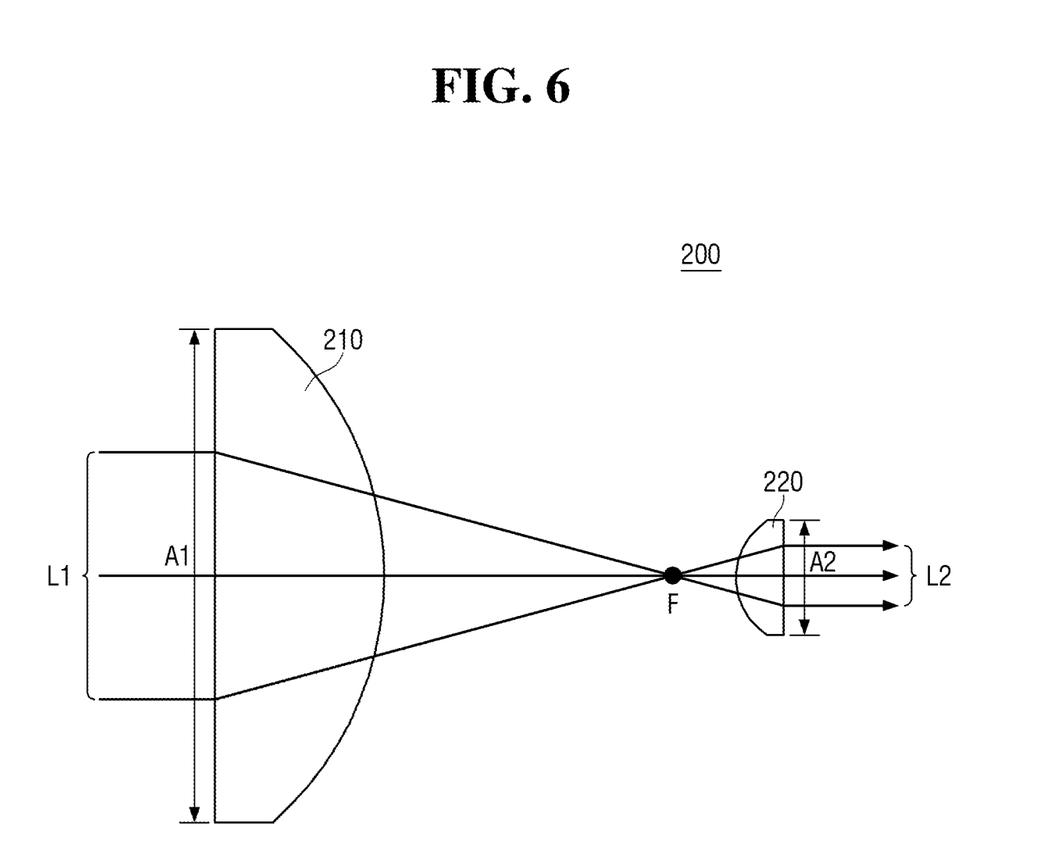
FIG. 6 is a schematic diagram showing an optical path of the light adjustment unit according to the exemplary embodiment of the present disclosure.

FIG. 6 is a schematic diagram showing an optical path of the light adjustment unit according to the exemplary embodiment of the present disclosure. Referring to FIG. 6, the first light L1 that is generated from the light source unit 100 may proceed substantially parallel to the optical axis Ax of the first lens 210, may be incident on the first lens 210, and then, may be concentrated on a focal point F disposed between the first lens 210 and the second lens 220. Subsequently, the first light L1 may be converted into a second light L2 which is parallel to the optical axis Ax of the second lens 220 and be emitted by the second lens 220.

In other words, the light adjustment unit 200 may adjust the light to cause the light concentration of the second light L2 to be greater than the light concentration of the first light L1. Accordingly, the focal length may be increased, so that even if the position where the image is formed on the road surface around the vehicle changes, a clear image may be formed.

Figure 7:
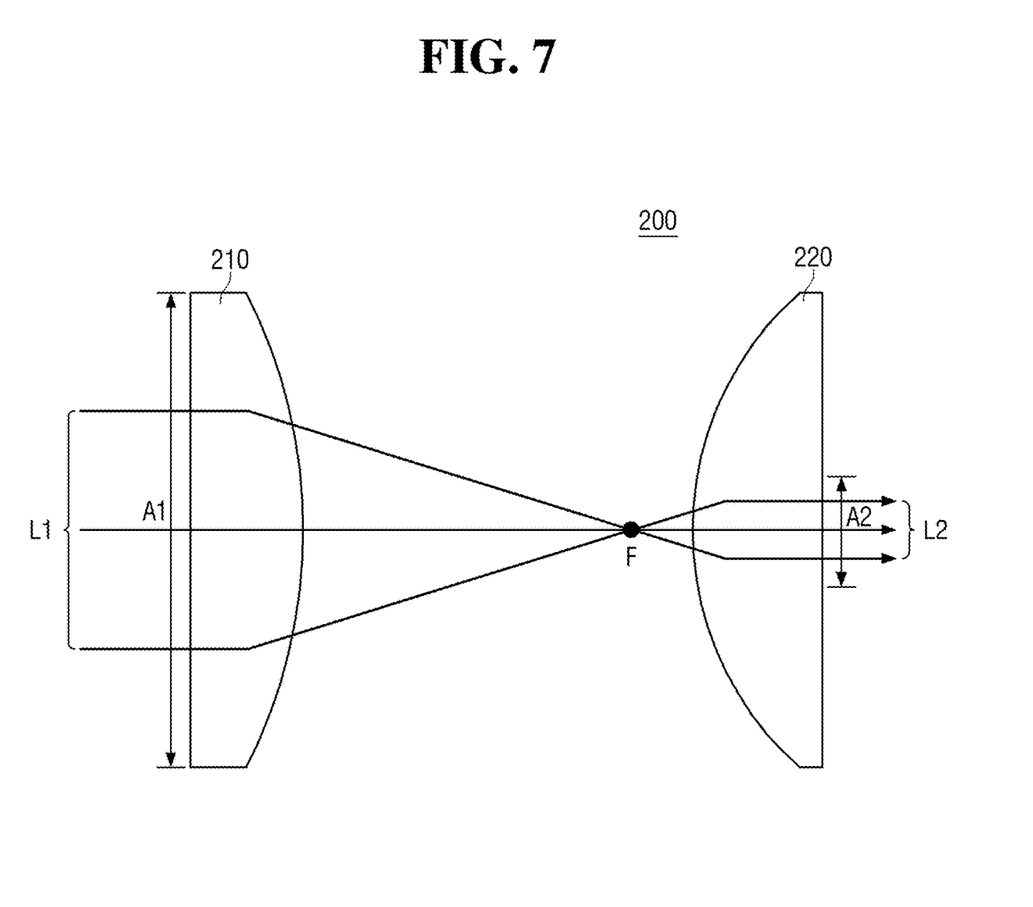
FIG. 7 is a schematic diagram showing a configuration of a light adjustment unit according to another exemplary embodiment of the present disclosure.

In FIGS. 5 and 6, the entire areas of the first lens 210 and the second lens 220 may serve as the effective areas, and the first lens 210 may be larger than the second lens 220 to allow the first lens 210 to have a larger effective area than the second lens 220, and thereby to allow the first lens 210 and the second lens 220 to have different focal lengths. However, the present disclosure is not limited thereto, and even if the first lens 210 and the second lens 220 have the same size, the first lens 210 may have a larger effective area than the second lens 220 by adjusting optical properties such as curvatures of an incident or emitting surface of at least one of the first lens 210 and the second lens 220 as shown in FIG. 7. Accordingly, the light may be adjusted to cause the light concentration of the second light L2 to be greater than the light concentration of the first light L1.

Figure 8:
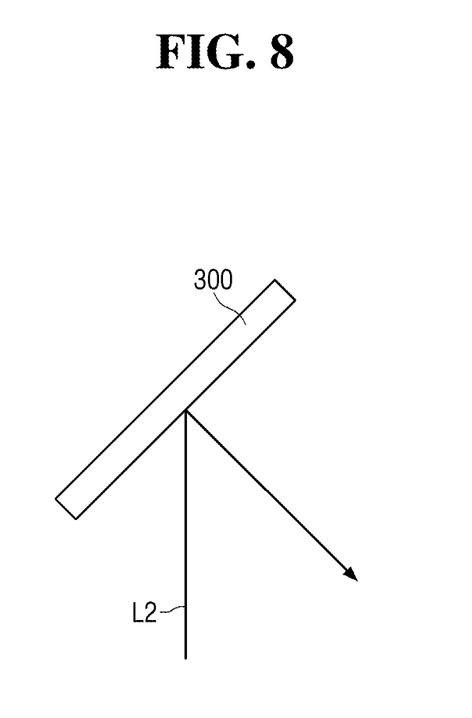
FIGS. 8 to 10 are schematic diagrams showing a light irradiation direction depending on a position of a movable mirror unit according to the exemplary embodiment of the present disclosure.
Figure 9:
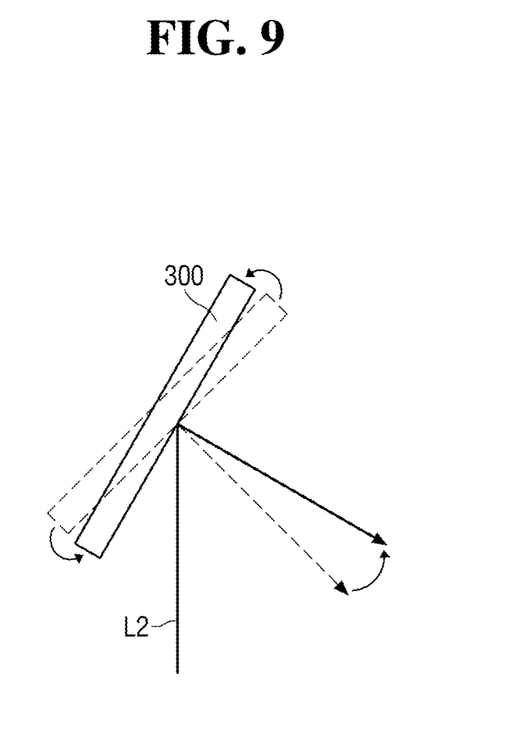
Figure 10:
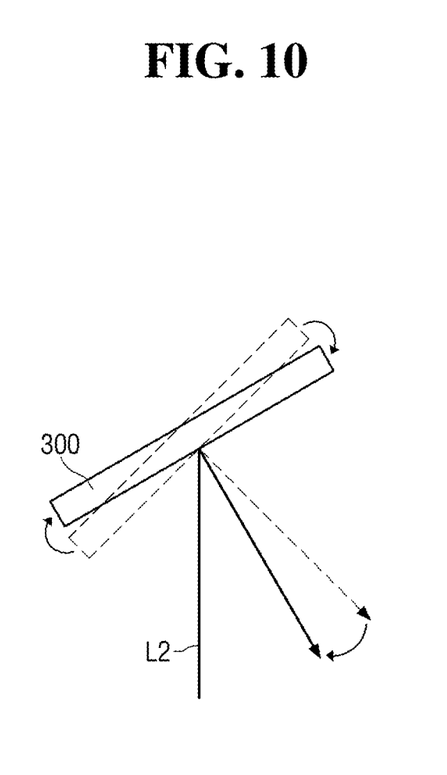

The movable mirror unit 300 may adjust a direction of the second light L2, the light concentration of which has been adjusted by the light adjustment unit 200. A direction of the light that is reflected by the movable mirror unit 300 may be changed depending on a position of the movable mirror unit 300. Accordingly, the position where the image is formed on the road surface around the vehicle may be changed. In other words, whereas the movable mirror 300 initially has a position as shown in FIG. 8, as the position of the movable mirror 300 is changed as shown in FIGS. 9 and 10, the direction of the light that is reflected by the movable mirror 300 may be changed. Therefore, the position where the image is formed on the road surface around the vehicle may be changed.

Here, the dotted arrows in FIGS. 9 and 10 indicate a reflection direction when the movable mirror unit 300 is at the initial position shown in FIG. 8, and the dotted arrows may be used for comparison with a reflection direction when the position of the movable mirror 300 is changed as shown in FIGS. 9 and 10.

In the exemplary embodiment of the present disclosure, it is described as an example in which the movable mirror unit 300 is rotated to adjust its position. However, this configuration is only an example for helping the understanding of the present disclosure. The present disclosure is not limited thereto, and the movable mirror unit 300 may be adjusted in position by rotational motion, linear motion, or a combination thereof.

Figure 11:
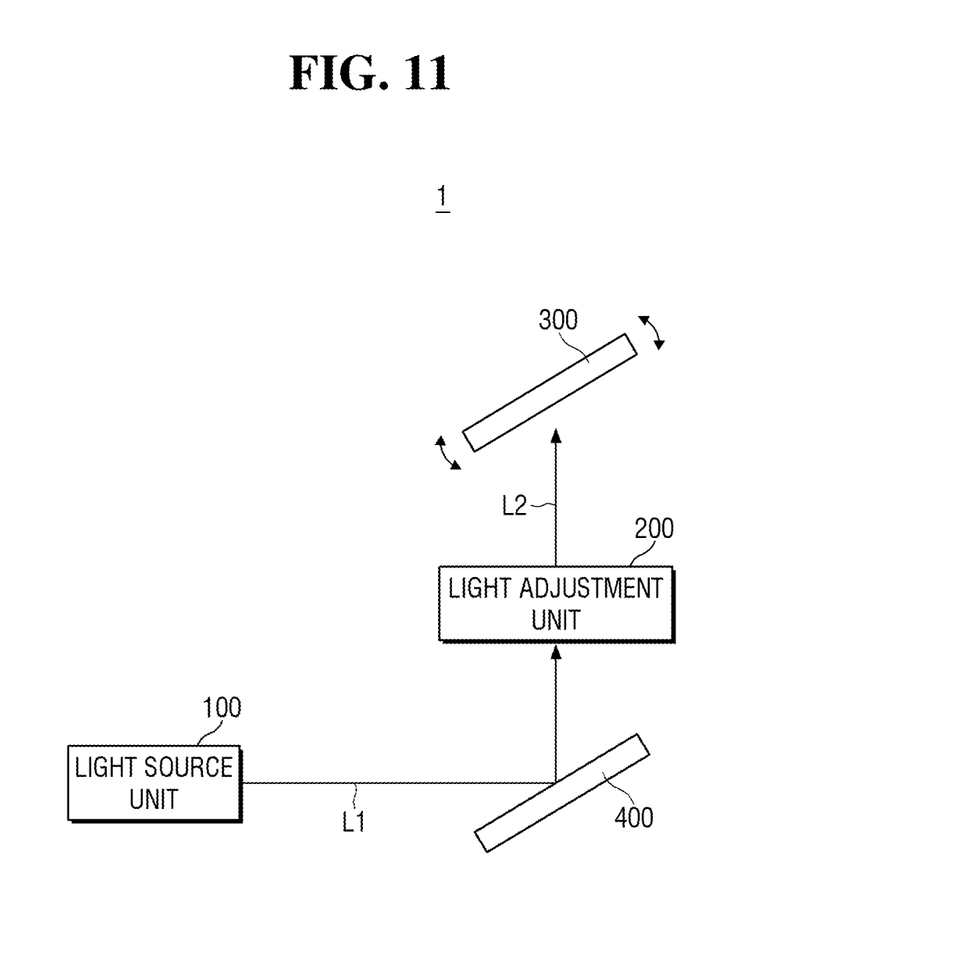
FIG. 11 is a schematic diagram showing a configuration of a lamp for a vehicle according to another exemplary embodiment of the present disclosure.

In the exemplary embodiment as described above, it is described as an example in which the first light L1 generated from the light source unit 100 is directly incident on the light adjustment unit 200. However, the present disclosure is not limited thereto, and when it is necessary to change the path of the light due to a layout of the lamp for the vehicle 1 of the present disclosure or for design reasons or the like, the first light L1 generated from the light source unit 100 may be reflected by an additional mirror unit 400 and may proceed to the light adjustment unit 200, as shown in FIG. 11. In this case, the movable mirror unit 300 and the mirror unit 400 may be disposed to face each other to allow the light reflected by the mirror unit 400 to proceed to the movable mirror unit 300 through the light adjustment unit 200.

In FIG. 11, it is described as an example in which the mirror unit 400 is formed as a single unit. However, this configuration is only an example for helping the understanding of the present disclosure. The present disclosure is not limited thereto, and two or more mirror units 400 may be provided to change the path of light.

Figure 12:
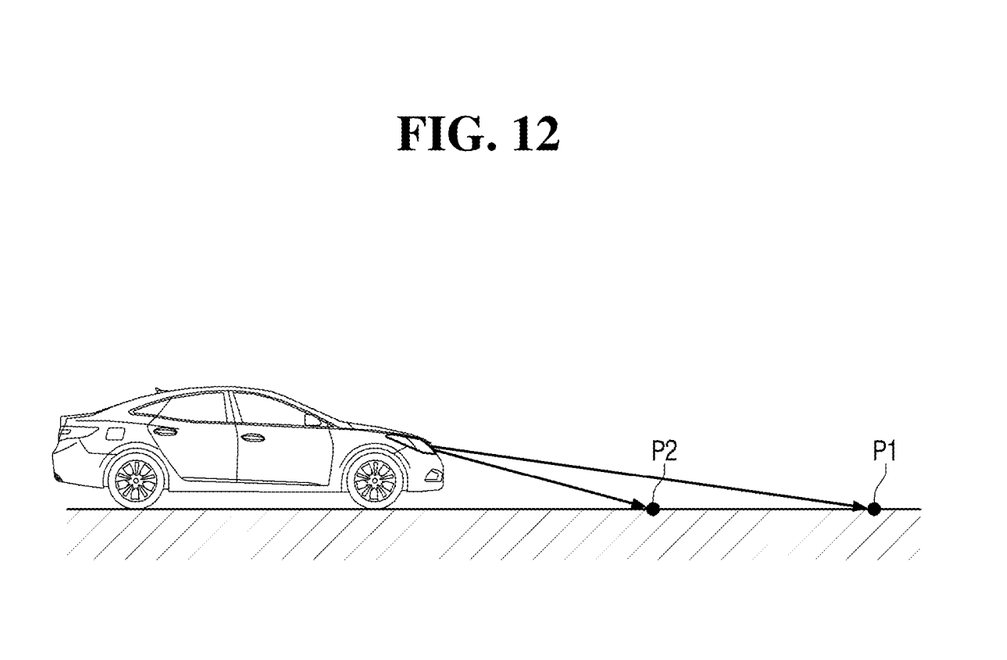
FIG. 12 is a schematic diagram showing a position where light is irradiated to a road surface around a vehicle from the lamp for the vehicle according to the exemplary embodiment of the present disclosure.

FIG. 12 is a schematic diagram showing the position where the light is irradiated (e.g., projected) to the road surface around the vehicle from the lamp for the vehicle according to the exemplary embodiment of the present disclosure, and FIG. 12 shows an example where the lamp for the vehicle of the present disclosure is installed on the front of the vehicle and is provided at a head lamp that irradiates light in the driving direction of the vehicle.

Referring to FIG. 12, in the lamp for the vehicle 1 according to the exemplary embodiment of the present disclosure, the second light L2 that is concentrated by the light adjustment unit 200 may be irradiated to a first position P1 or a second position P2 depending on the position of the movable mirror unit 300, to form a predetermined image. In FIG. 12, it is described as an example in which the light is irradiated to either the first position P1 or the second position P2. However, the present disclosure is not limited thereto, and the position to which the light is irradiated may be added, removed, or changed depending on the position of the movable mirror 300.

As described above, in the present disclosure, when the light is irradiated to the first position P1 or the second position P2 by the movable mirror unit 300, the light may be concentrated by the light adjustment unit 200, so that the focal length is relatively long. Therefore, a clearer image may be formed than when the focal length is shorter. Accordingly, more accurate information may be delivered both when the image is formed at the first position P1 and when the image is formed at the second position P2.

In addition, when the lamp for the vehicle 1 of the present disclosure is provided in the head lamp, it may be accommodated in an accommodation space formed by a lamp housing (not shown) of the head lamp and a cover lens (not shown) coupled to the lamp housing. Therefore, a better protection from external impact may be provided. In addition, since no separate structure is required to prevent foreign matters such as dust from entering from the exterior, the configuration may be simplified, and the cost may be reduced.

In FIG. 12, it is described as an example in which the lamp for the vehicle 1 of the present disclosure is provided in the head lamp. However, the present disclosure is not limited thereto, and the lamp for the vehicle 1 of the present disclosure may be accommodated in a space formed by the lamp housing and the cover lens of various lamps installed in the vehicle.

As described above, the lamp for the vehicle 1 of the present disclosure may be provided in plurality in order to form an image of a predetermined shape on a road surface around the vehicle by the lamp for the vehicle 1 of the present disclosure. In this case, the position of the movable mirror unit 300 of each of the plurality of vehicle lamps 1 may be adjusted to form each image having a desired shape.

In concluding the detailed description, those skilled in the art will appreciate that many variations and modifications can be made to the exemplary embodiments without departing from the principles of the present disclosure. Therefore, the disclosed exemplary embodiments of the disclosure are used in a generic and descriptive sense only and not for purposes of limitation.

What is claimed is:

1. A lamp for a vehicle, comprising:
   a light source unit for generating a first light;
   a light adjustment unit for adjusting a first light concentration for the first light to generate a second light having a second light concentration that is different from the first light concentration; and
   a movable mirror unit for reflecting the second light to form an image of a predetermined shape on a road surface,
   wherein a position where the image is formed on the road surface is changed depending on a position of the movable mirror unit,
   wherein the light adjustment unit comprises a plurality of lenses, wherein the plurality of lenses have different effective areas,
   wherein the plurality of lenses comprise:
      a first lens to which the first light is incident; and
      a second lens from which the second light is emitted, wherein an effective area of the first lens is greater than an effective area of the second lens, and wherein the first lens causes the first light to be concentrated on a focal point that is disposed between the first lens and the second lens.

2. The lamp of claim 1, wherein the light source unit comprises:
   a plurality of light sources; and
   an optical unit for synthesizing light generated from the plurality of light sources to generate the first light.

3. The lamp of claim 2, wherein at least some of the plurality of light sources generate light of different colors.

4. The lamp of claim 2, wherein the optical unit causes the light generated from each of the plurality of light sources to be transmitted or reflected.

5. The lamp of claim 2, wherein the optical unit comprises a prism or a mirror.

6. The lamp of claim 1, wherein the first lens and the second lens have a same optical axis.

7. The lamp of claim 6, wherein the first light incident on the first lens and the second light emitted from the second lens proceed substantially parallel to the optical axis.

8. The lamp of claim 1, wherein the first lens has a focal length different from a focal length of the second lens.

9. The lamp of claim 1, further comprising:
   a mirror unit for reflecting the first light and causing the first light to proceed to the light adjustment unit.

10. The lamp of claim 9, wherein at least a portion of the mirror unit faces the movable mirror unit to allow the first light to pass through the light adjustment unit and proceed to the movable mirror unit.

\* \* \* \* \*